US010198967B1

United States Patent
Agrawal et al.

(10) Patent No.: US 10,198,967 B1
(45) Date of Patent: Feb. 5, 2019

(54) ENABLING A DYNAMIC INTELLIGENT TRAINING FUNCTIONALITY OF AN AUTOMATED EXTERNAL DEFIBRILLATOR WITH AN INTEGRATED MEDICAL KIT

(71) Applicants: Akhil K. Agrawal, Davie, FL (US); Sukrit Agrawal, Miami, FL (US)

(72) Inventors: Akhil K. Agrawal, Davie, FL (US); Sukrit Agrawal, Miami, FL (US)

( * ) Notice: Subject to any disclaimer, the term of this patent is extended or adjusted under 35 U.S.C. 154(b) by 247 days.

(21) Appl. No.: 15/170,389

(22) Filed: Jun. 1, 2016

(51) Int. Cl.
  *A61B 5/00* (2006.01)
  *G09B 23/30* (2006.01)
  *G09B 5/02* (2006.01)

(52) U.S. Cl.
  CPC .............. *G09B 23/30* (2013.01); *G09B 5/02* (2013.01)

(58) Field of Classification Search
  USPC ........................................................ 434/308
  See application file for complete search history.

(56) References Cited

U.S. PATENT DOCUMENTS

| | | | | |
|---|---|---|---|---|
| 2003/0233129 A1* | 12/2003 | Matos | .................. | A61B 5/0006 607/5 |
| 2004/0249419 A1* | 12/2004 | Chapman | ............. | A61N 1/3925 607/5 |
| 2007/0299473 A1* | 12/2007 | Matos | .................. | A61N 1/0476 607/5 |
| 2010/0022904 A1* | 1/2010 | Centen | ................. | A61H 31/005 600/534 |
| 2013/0205257 A1* | 8/2013 | Albright | ............. | G06F 3/04842 715/810 |
| 2013/0304143 A1* | 11/2013 | Banville | .................. | A61N 1/39 607/5 |
| 2014/0227671 A1* | 8/2014 | Olmstead | ............... | G11B 27/10 434/308 |
| 2015/0325148 A1* | 11/2015 | Kim | ......................... | G09B 5/02 434/265 |
| 2016/0296167 A1* | 10/2016 | Kantor | ..................... | A61N 1/39 |

* cited by examiner

*Primary Examiner* — Masud Ahmed
(74) *Attorney, Agent, or Firm* — Patents on Demand, Pa; Brian K. Buchheit (57) ABSTRACT

A portable medical kit can be identified. The portable medical kit can include one or more medical consumables including bandages, an automated external defibrillator (AED), a sensor for monitoring a quantity of the consumables present in the portable medical kit and for monitoring a charge state and power level of the AED, and a wireless transceiver for communicating the quantity of consumables present in the kit, the charge state, and power level of the AED to a remotely located computing device. A proximate medical training equipment can be detected. The equipment can facilitate the training of a user with the AED or the medical training equipment. A training functionality of the portable medical kit can be activated to enable safe practice with the kit and the equipment. The training functionality can include selectable training content that specifically instructs the user on the use of the kit and the equipment.

20 Claims, 3 Drawing Sheets

ENABLING A DYNAMIC INTELLIGENT TRAINING FUNCTIONALITY OF AN AUTOMATED EXTERNAL DEFIBRILLATOR WITH AN INTEGRATED MEDICAL KIT

BACKGROUND

The present invention relates to the field of portable medical kits and, more particularly, to enabling a dynamic intelligent training functionality of an automated external defibrillator with an integrated medical kit.

With increasing cardiac problems in the general population an ever increasing aging population, the need for public access to medical life saving devices such as automated external defibrillators is continuing to grow. To meet this need, automated external defibrillator (AED) manufacturers have been producing AEDs which are easy to use. Coupled with first aid organizations that are ensuring the AEDs are placed within many public areas, AEDs are common place in many public areas. As a result, AEDs have been useful in saving countless lives by first responders as well as laypersons alike.

Many laypersons desire to learn how to use these devices and how to perform life saving medical procedures but are often too busy or unaware of resources which can be used to learn these techniques. In many instances, when provided with the opportunity to learn these techniques, these laypersons use these techniques to subsequently save lives. Bringing education and/or training to the layperson is costly and time consuming and as such is rarely performed, but the benefits are substantial.

BRIEF SUMMARY

One aspect of the present invention can include a method for enabling a dynamic intelligent training functionality of an automated external defibrillator with an integrated medical kit. A portable medical kit can be identified. The portable medical kit can include one or more medical consumables including bandages, an automated external defibrillator (AED), a sensor for monitoring a quantity of the consumables present in the portable medical kit and for monitoring a charge state and power level of the AED, and a wireless transceiver for communicating the quantity of consumables present in the kit, the charge state, and power level of the AED to a remotely located computing device. A proximate medical training equipment can be detected. The equipment can facilitate the training of a user with the AED or the medical training equipment. A training functionality of the portable medical kit can be activated to enable safe practice with the kit and the equipment. The training functionality can include selectable training content that specifically instructs the user on the use of the kit and the equipment.

Another aspect of the present invention can include a system for enabling a dynamic intelligent training functionality of an automated external defibrillator with an integrated medical kit. A training engine of a portable medical kit can be configured to detect removal of a portable medical kit from a base location and automatically present a training media responsive to the removal. The portable medical kit can include one or more medical consumables including bandages, an automated external defibrillator (AED), a sensor for monitoring a quantity of the medical consumables present in the portable medical kit and for monitoring a charge state and power level of the AED, and a wireless transceiver for communicating the quantity of medical consumables present in the portable medical kit, the charge state and power level of the AED to a remotely located computing device. A data store of the portable medical kit can be configured to persist the training media that specifically instructs a user on the user of the kit and/or the medical consumables, a set of location based triggers, an event log, and a location data set.

Yet another aspect of the present invention can include a computer program product that includes a computer readable storage medium having embedded computer usable program code. The computer usable program code can be configured to detect a previously determined required interaction between a portable medical kit and a medical training equipment. The portable medical kit can include medical consumables including bandages, an automated external defibrillator (AED), a sensor for monitoring a quantity of the medical consumables present in the portable medical kit and for monitoring a charge state and power level of the AED, and a wireless transceiver for communicating the quantity of medical consumables present in the portable medical kit, the charge state and power level of the AED to a remotely located computing device. The computer usable program code stored in a storage medium, if said computer usable program code is executed by a processor it is operable to establish the completion of a portion of a set of objectives associated with the use of the portable medical kit. The computer usable program code stored in a storage medium, if said computer usable program code is executed by a processor it is operable to present a summary of the set of objectives based on the interaction.

DETAILED DESCRIPTION

The present disclosure is a solution for enabling a dynamic intelligent training functionality of an automated external defibrillator with an integrated medical kit. In the solution, an automated external defibrillator (AED) embedded within a portable medical kit can include a training functionality. In one embodiment, the training functionality can present one or more training media when a training functionality is enabled. In the embodiment, training media persisted within a data store of the portable medical kit can be presented within a display. In one instance, the portable medical kit can detect one or more proximate medical training devices. In the instance, the portable medical kit can activate a training functionality and present an appropriate training video for practicing with the medical training device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
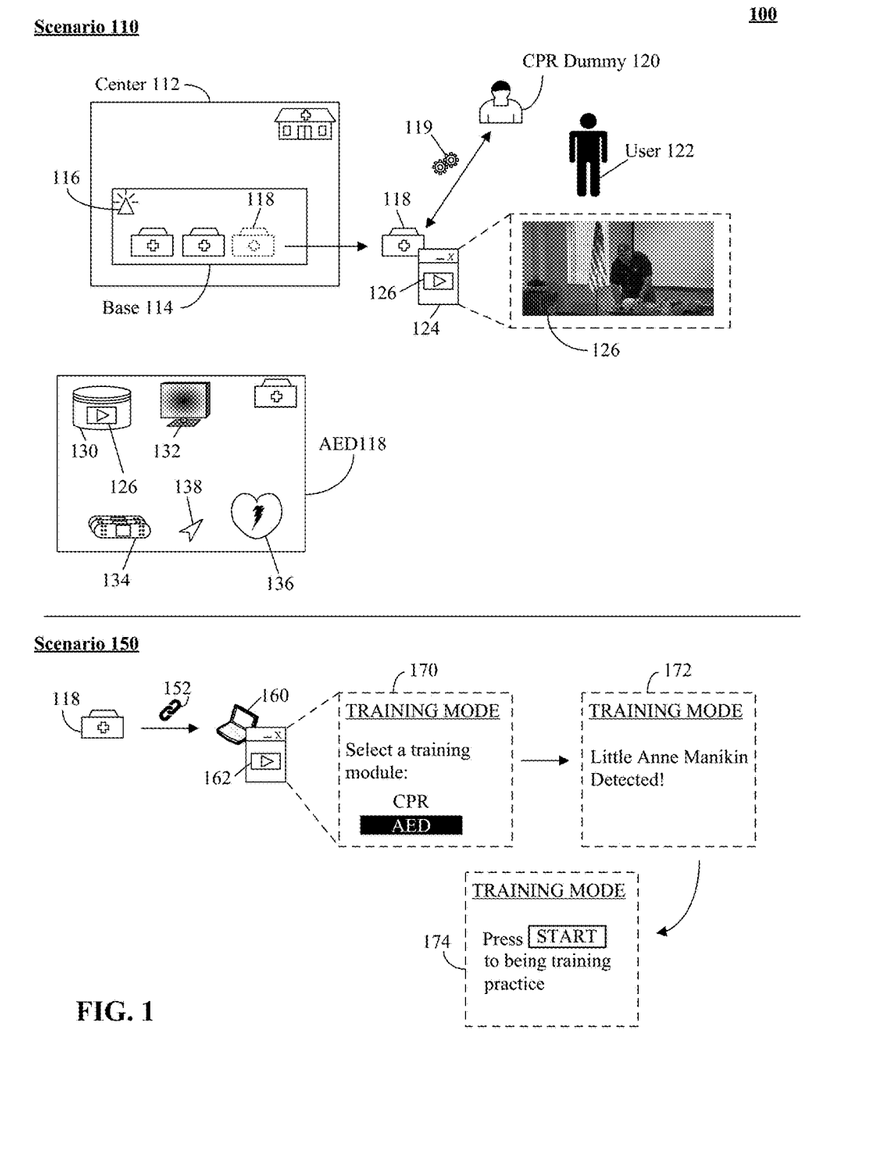
FIG. 1 is a schematic diagram illustrating a scenario for enabling a dynamic intelligent training functionality of an automated external defibrillator with an integrated medical kit in accordance with an embodiment of the inventive arrangements disclosed herein.

FIG. 1 is a schematic diagram illustrating a set of scenarios 110, 150 for enabling a dynamic intelligent training functionality of an automated external defibrillator with an integrated medical kit in accordance with an embodiment of the inventive arrangements disclosed herein. Scenario 110, 150 can be present in the context of method 200 and/or system 300. Scenario 150 can be performed in the context of scenario 110. In scenario 110, an automated external defibrillator (AED) 118 with an integrated medical kit can be present within a center 112 (e.g., home location). When the defibrillator is moved outside the center 112, a training mode 119 can be enabled. In scenario 150, a set of interfaces 170-174 can guide a user through a training mode 119 setup and execution. It should be appreciated that the training mode 119 of the disclosure can location dependent or location independent.

As used herein, center 112 can be a temporary or permanent structure able to house one or more AEDs 118. Base 114 can be a temporary and/or permanent location where AEDs 118 can reside. For example, base 114 can be a first aid station, AED recharging station, a supply station, or a public access AED kiosk. In one embodiment, center 112 and/or base 114 can include a beacon 116 which can be utilized to electronically identify a previously established location of the center 112 and/or base 114. For example, beacon 114 can be an iBeacon base station which can broadcast GPS coordinates to an AED 118 or a nearby computing device. It should be appreciated that center 112 and/or base 114 can be associated with a bounded geographical region which can define two or three dimensional parameters for a specified area.

As used herein, CPR dummy 120 can be a medical training equipment able to permit the practice of medical procedures by users using the training equipment. Medical training equipment can include, but is not limited to a training manikin (e.g., TraumaMan, a surgical training manikin used in ATLS training), medical equipment, and the like. For example, CPR dummy 120 can be a Resusci Anne manikin commonly used in America Red Cross cardiopulmonary resuscitation (CPR) training courses. In one embodiment, medical training equipment (e.g., dummy 120) can include one or more electronic components which can permit communication to AED 118 and/or computing devices (proximate or remote).

In one instance, AED 118 can include a data store 130, a display 132, medical supplies 134, an AED component 136, location transceiver 138, and the like. In the instance, data store 130 can persist one or more training videos 126 which can be manually and/or automatically presented.

In one embodiment, when AED 118 is moved from a base 114 location to a different location (e.g., outside center 112) and a CPR dummy 120 is present, an appropriate CPR training video (e.g., video 126) can be presented within an interface 126 of display 132. In one configuration of the embodiment, a training mode 119 can permit AED 118 to function in a safe mode which allows the practice of AED 118 usage with or without dummy 120. That is, user 122 can utilize AED 118 to practice performing treatment on CPR dummy 120 without discharging the AED component 136.

It should be understood that video 126 can include traditional and/or proprietary content. For example, video 126 can be a video content of a library of content including "How to Perform CPR", "AED Procedures", and "How to Use the Eye Wash Center".

It should be appreciated that video 126 playback can include traditional and/or proprietary controls including, but not limited to, rewind, fast forward, play, pause, and the like. In one instance, video 126 can include segmented content including, but not limited to chapters, sequences, and the like. In one embodiment, video 126 playback can automatically pause (e.g., predefined markers) to enable practice with dummy 120.

In one instance, AED 118 capabilities can be artificially limited during training mode 119 operation. In the instance, the charge/discharge functionality can be simulated to ensure the safe practice with AED 118. In another instance, training mode 119 can include a live functionality wherein AED 118 capabilities are not restricted.

In scenario 150, AED 118 can automatically communicate with a computing device 160 to convey a Uniform Resource Locator (URL) 152 which can be utilized to present content 162. As used herein a URL can be a reference to a resource that specifies the resource location on a computer network and a mechanism for retrieving the resource. In one instance, content 162 can be a training video, video conference session, and the like. It should be appreciated that URL can be conveyed within a message including, but not limited to, electronic mail, Short Message Service (SMS), and the like.

In one embodiment, URL 152 can trigger a training mode activation which can present interfaces 170-174. In the embodiment, selection of menu items can be utilized to select specific training scenarios. For example, in interface 170 an AED training can be selected and in interface 174 a user can begin training when the user selects a "Start" button.

In one instance, training mode 119 can be manually triggered via one or more mechanisms. In the instance, training mode 119 can be initiated and/or terminated via a hardware push button, a software element (e.g., UI push button), and the like.

Drawings presented herein are for illustrative purposes only and should not be construed to limit the invention in any regard. It should be appreciated that interface 170-174 can be one or more screens of an AED 118 firmware, a health network management software program. It should be understood that interface 170-174 can include interface elements including, but not limited to, pull down selection list, checkboxes, radio dialog, push buttons, and the like. In one instance, training mode 119 can be remotely controlled via a communicatively linked computing device. For example, training mode 119 can be enabled through a companion application executing on a mobile phone. It should be appreciated that traditional and/or proprietary control protocols can be employed to enable remote control functionality.

Figure 2:
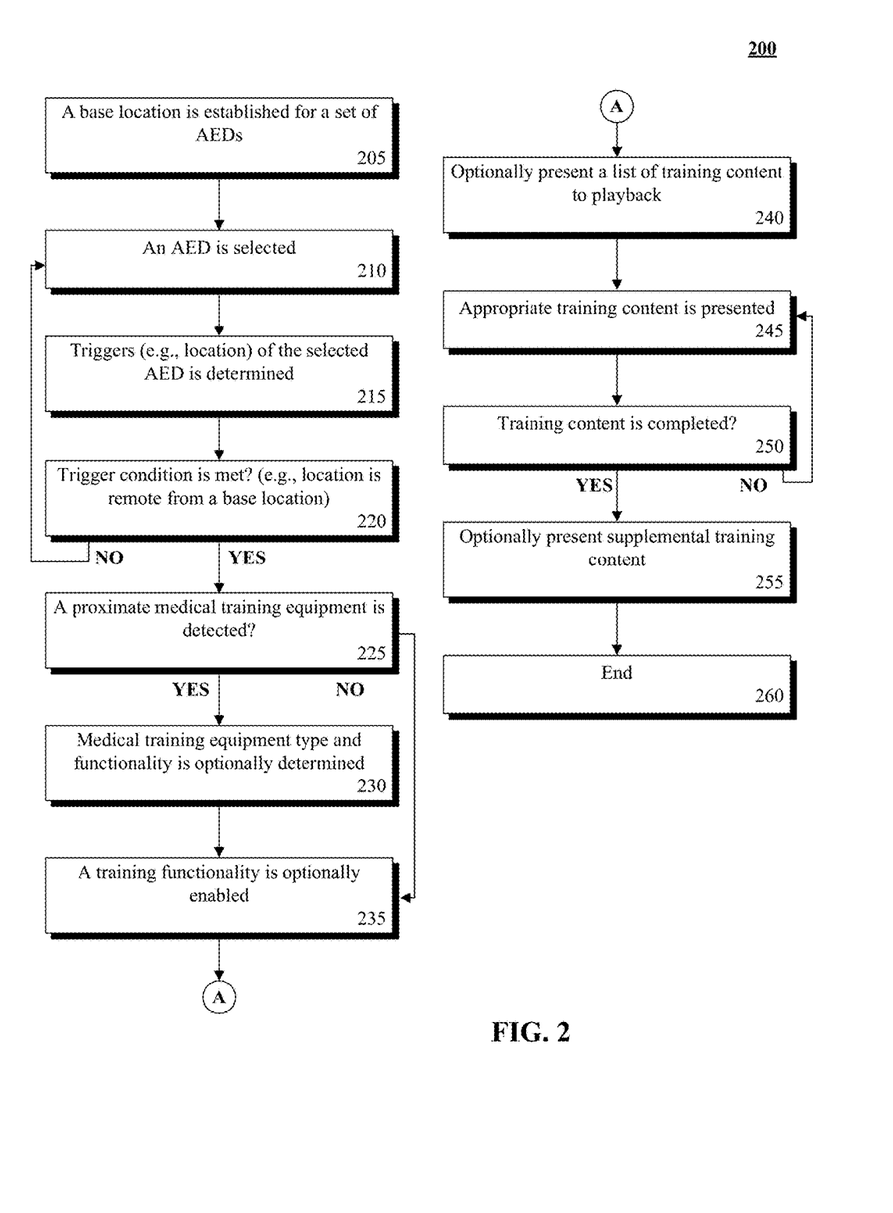
FIG. 2 is a schematic diagram illustrating a method for enabling a dynamic intelligent training functionality of an automated external defibrillator with an integrated medical kit in accordance with an embodiment of the inventive arrangements disclosed herein.
Figure 3:
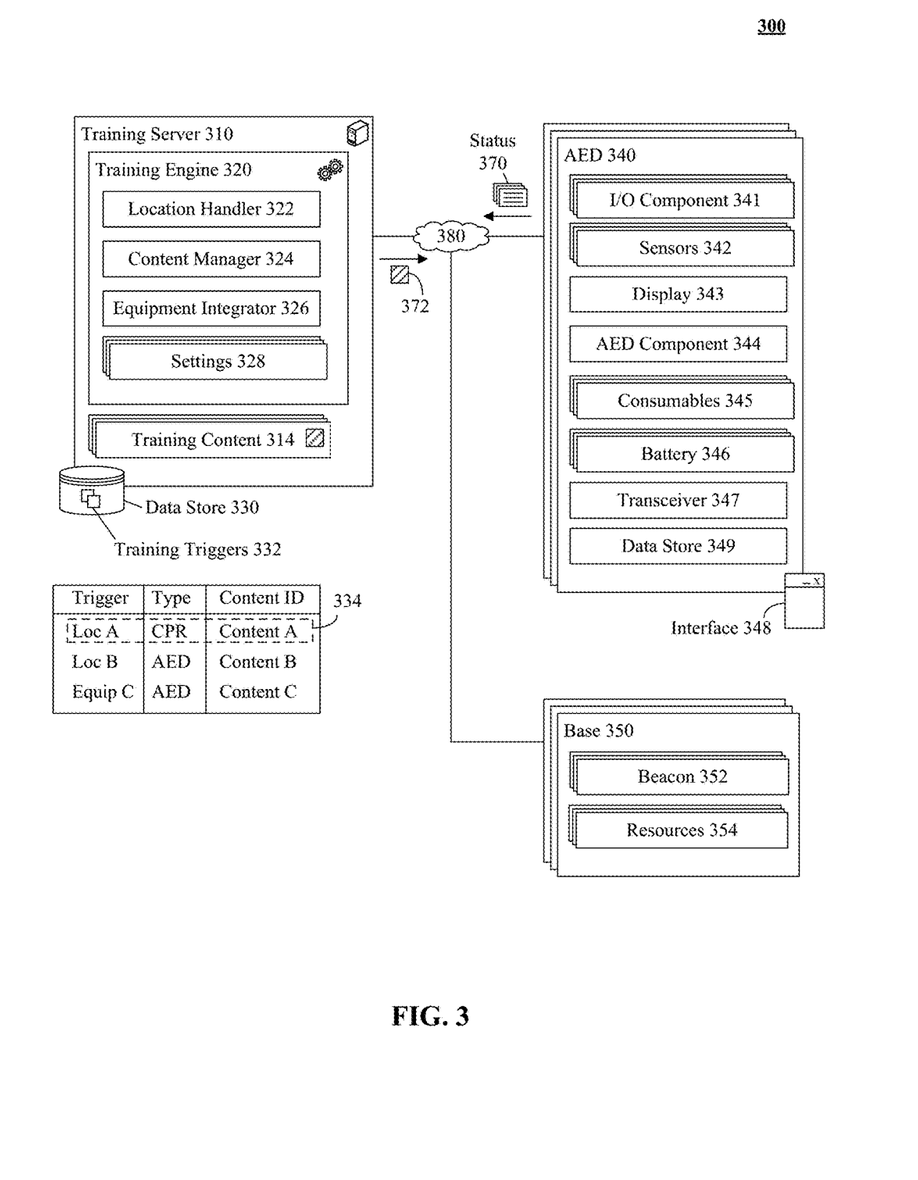
FIG. 3 is a schematic diagram illustrating a system for enabling a dynamic intelligent training functionality of an automated external defibrillator with an integrated medical kit in accordance with an embodiment of the inventive arrangements disclosed herein.

It should be appreciated that the disclosure (e.g., scenario 110, 150, method 200, system 300) can be associated with one or more networking and/or communication protocols including, but not limited to, Transport Control Protocol/ Internet Protocol (TcP/IP), BLUETOOTH (e.g., AVRCP), BLUETOOTH LOW ENERGY (BLE), WiFi Direct (e.g., MIRACAST), and the like.

It should be understood that AED 118 can include medical equipment and/or consumables associated with including, but not limited to, aquatic/marine first aid, battlefield first aid, hyperbaric first aid, oxygen first aid, wilderness first aid, and the like. In one embodiment, the AED 118 can include medical consumables, training content (e.g., instructional videos), for treatment of poisoning, burns, fractures, and the like.

It should be appreciated that playback of video 126 can include, gapless playback, advertisement interrupted playback, and the like. In one instance, video 126 can include additional content which can be persisted within a remote data storage.

FIG. 2 is a schematic diagram illustrating a method 200 for enabling a dynamic intelligent training functionality of an automated external defibrillator with an integrated medical kit in accordance with an embodiment of the inventive arrangements disclosed herein. Method 200 can be performed in the context of scenario 110 and/or system 300. In method 200, an automated external defibrillator (AED) with an integrated medical kit can automatically enable a training functionality based on one or more triggers.

In step 205, a base location can be established for a set of AEDs. The base location can include multiple base locations, multiple regions with multiple base locations, and the like. In one embodiment, base locations can be configured through one or more screens or interfaces of a computing device. In step 210, an AED is selected. AED can be selected based on one or more circumstances, including, by identifier (e.g., alphanumerically, alphabetically), randomly, by location, by AED state, and the like. For example, an AED can be selected based on AED state (e.g., active, in motion). In step 215, triggers of the selected AED can be determined. In one instance, triggers can be determined from parsing of settings, configuration files, and the like. It should be appreciated that triggers can include, but is not limited to, location, AED state, and the like. In step 224, if a proximate medical training equipment is detected, the method can continue to step 230, else proceed to step 235. In step 230, proximate medical training equipment type and functionality can be optionally determined. It should be appreciated that equipment type and functionality can be manually and/or automatically determined. For example, a user can input the type of medical training equipment from a list of training equipment presented on a screen of the AED.

In step 235, a training functionality of the AED can be optionally enabled. In one embodiment, the AED can include one or more audible and/or visual notifications indicating a training functionality has been enabled. In step 240, a list of training content to playback can be optionally presented within a screen of the AED. In step 245, an appropriate training content can be presented (e.g., from a user selection, based on proximate medical training equipment type, location of AED). In step 250, if training content is completed, the method can continue to step 255, else return to step 245. In step 255, supplemental training content can be optionally presented. In step 260, the method can end.

Drawings presented herein are for illustrative purposes only and should not be construed to limit the invention in any regard. Steps 210-255 can be repeated for each detected/registered AED within a region, a location, and the like. Steps 205-260 can be performed in serial and/or in parallel. It should be appreciated that method 200 can be performed within an AED or a proximate computing device. It should be understood that notifications within method and/or disclosure can include traditional and/or proprietary messaging mechanisms, including, but not limited to, an optical beacon (e.g. blinking light), an audio cue (e.g., intermittent beep) electronic mail, Short Message Service (SMS), inter process communication (IPC), and the like.

FIG. 3 is a schematic diagram illustrating a system 300 for enabling a dynamic intelligent training functionality of an automated external defibrillator with an integrated medical kit in accordance with an embodiment of the inventive arrangements disclosed herein. System 300 can be present in the context of scenario 110 and/or method 200. In system 300, a training server can permit an intelligent training functionality of an AED to be activated and/or deactivated appropriately. It should be appreciated that system 300 components can be communicatively linked via one or more wired networks 380. In one instance, AED 340 can communicate a status 370 which can indicate a location associated with AED 340. In one embodiment, status 370 can be periodically conveyed, requested (e.g., via engine 320), and the like.

Training server 310 can be a hardware/software entity for executing a training engine 320. Training server 310 can include, but is not limited to, a training engine 320, training content 314, a data store 330, and the like. Server 310 functionality can include, but is not limited to, load balancing, encryption (e.g., secure communication channels), caching, and the like. In one embodiment, server 310 can be component of a distributed computing system, a networked computing environment, and the like. In one embodiment, status 370 information conveyed from AED 340 can be processed by training server 310 and/or engine 320 to produce an appropriate output (e.g., presenting a training content 314).

Training engine 320 can be a hardware/software entity for enabling a training mode of an AED 340. Engine 320 functionality can include, but is not limited to, remote control functionality, playback control, status queries, trigger management, and the like. Engine 320 can include, but is not limited to location handler 322, content manager 324, equipment integrator 326, settings 328, and the like. In one embodiment, engine 320 can be utilized to establish, configure, and/or manage triggers 332. In one instance, engine 320 can be utilized to convey one or more portions of training content, Uniform Resource Identifiers associated with training content, and the like.

Location handler 322 can be a hardware/software element for determining location of beacon 352 and/or AED 340. Handler 322 functionality can include, but is not limited to, location determination, geographic boundary management, and the like. In one instance, handler 322 can analyze status 370 from AED 340 to determine AED location. In the instance, location can be relative or absolute. For example, location of AED 340 can be relative to another AED or a base 350. In one embodiment, handler 322 can be utilized to perform location queries, present pre-defined locations (e.g., bases), and the like.

Content manager 324 can be a hardware/software entity for organizing and/or controlling content 314. Manager 324 functionality can include, but is not limited to, content 314 addition, content 314 deletion, content 314 modification, and the like. In one instance, manager 324 can present an interface to select content 314 playback. In one embodiment, manager 324 can be a functionality of a AED 340, engine 320, and the like.

Equipment integrator 326 can be a hardware/software entity for enabling detection and/or communication with one or more medical training equipment (e.g., resources 354). Integrator 326 functionality can include, but is not limited to, manual and/or automated equipment detection, training inventory management, and the like. In one instance, integrator 326 can permit the functionality of a training equipment to be automatically detected. In the instance, training equipment metadata can be utilized to provide training equipment specific instructions during content 314 playback.

Settings 328 can be one or more options for configuring the behavior of system 300, server 310, engine 320 and/or system 300 components. Settings 328 can include, but is not limited to, location handler 322 options, content manager 324 settings, equipment integrator 326 options, triggers 332 settings, and the like. It should be appreciated that settings 328 can be manually and/or automatically established. Settings 328 can be persisted within data store 330, data store 349, and the like.

Data store 330 can be a hardware/software component able to persist engine 320 settings, engine 320 generated data, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to a server in one or more traditional and/or proprietary mechanisms. In one instance, data store 330 can be a component of Structured Query Language (SQL) complaint database. In one embodiment, data store 330 can be a removable storage media including, but not limited to, a Secure Digital (SD) card, a Secure Digital High Capacity (SDHC) card, a Compact Flash (CF) card, and the like.

Training triggers 332 can be one or more conditions which can automatically initiate a programmatic action associated with AED 340. Triggers 332 can include, but is not limited to, a trigger type, a trigger identifier, a medical training equipment type, a content identifier, an authorization code (e.g., password, numeric code), and the like. For example, a trigger for automatically presenting a CPR training video (e.g., Content A) at a Location A when a CPR dummy is present can be established using trigger entry 334. In one instance, trigger 332 can be manually and/or automatically established.

Smart AED 340 can be a hardware/software device for providing medical consumables and/or medical support. AED 340 can include, but is not limited to I/O component 341, sensors 342, display 343, AED 344, consumables, 345, battery 346, transceiver 347 (e.g., RFID), interface 348, data store 349, and the like. AED 340 can include, but is not limited to, a unique identifier, one or more security mechanisms (e.g., electronic locks), near field communication transceivers, and the like. I/O components 341 can include, but is not limited to, a microphone, a camera, a keyboard, a touch screen, and the like. Display 343 can include, but is not limited to, a thin-film transistor screen, liquid crystal display screen, active-matrix organic light-emitting diode screen, and the like. AED 344 can include visual and/or audio commands which can direct a user through a process of using the AED 344. Interface 348 capabilities can include a graphical user interface (GUI), voice user interface (VUI), mixed-mode interface, and the like. In one instance, interface 348 can be communicatively linked to device 340. It should be appreciated that AED can include, but is not limited to, processors, data stores, and the like. In one embodiment, device 340 can include a data store able to persist training content 314. In one instance, device 340 can communicate with a remote (e.g., training server 310) or proximate computing device (e.g., laptop) to acquire and/or present content 314. In one embodiment, AED 340 can include a location aware transceiver (e.g., GPS transponder) which can be utilized to determine AED 340 position relative to base 350.

Base 350 can be a temporary and/or permanent entity established to house AED 340 and/or supplies to event participants, medical first aid, and/or provisions during major events, disaster response situations, and/or military operations. For example, base 350 can be a first aid kiosk within a theme park, outdoor sporting event, or within a restaurant. Base 350 can include, but is not limited to, beacon 352, resources 354, and the like. In one embodiment, beacon 352 can be a conspicuous device designed to identify a specific location (e.g., base 350). For example, beacon can be a location aware marker beacon such as a GPS transponder or a IEEE 802.11 compliant beacon (e.g., WiFi beacon). Resources 354 can include, but is not limited to, one or more medical training equipment, one or more medical consumables, human agents (e.g., first responders, non-first responders), supplies (e.g., non-medical supplies such as water), and the like.

Drawings presented herein are for illustrative purposes only and should not be construed to limit the invention in any regard. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like. In one embodiment, engine 320 can be a functionality of a Web-based Service, an Asynchronous Javascript and Extensible Markup Language (AJAX) functionality, Web application, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for enabling a portable medical kit with a training capability comprising:

identifying a portable medical kit, wherein the portable medical kit comprises at least one of a plurality of medical consumables including bandages, an automated external defibrillator (AED), at least one sensor for monitoring a quantity of the medical consumables present in the portable medical kit and for monitoring a charge state and power level of the AED, and a wireless transceiver for communicating the quantity of medical consumables present in the portable medical kit, the charge state and power level of the AED to at least one remotely located computing device;

detecting, via a computing device, a proximate medical training equipment, wherein the equipment facilitates the training of a user with at least one of the AED and the medical training equipment; and responsive to detecting the proximate medical training equipment, reactively automatically activating a training mode and a training functionality of the portable medical kit to enable safe practice with the portable medical kit, wherein the safe practice of training mode artificially limits capabilities of the AED from those existent in live functionality of the AED, wherein in the training mode the AED is limited so that electrical discharging of the AED to allow a heart to reestablish an effective rhythm is disabled while the training mode is active, wherein in absence of the detecting of the proximate medical equipment the AED is not in a training mode and capabilities of the AED to discharge electricity to allow a heart to reestablish an effective rhythm is enabled, wherein the training functionality comprises selectable training content that specifically instructs the user on the use of at least one of the kit and the medical training equipment.

2. The method of claim 1, wherein the training content comprises training for using the medical consumables determined as being present in the portable medical kit to treat poisoning, burns, or fractures.

3. The method of claim 1, wherein the detecting of medical equipment specifically detects a presence of a cardiopulmonary resuscitation (CPR) manikin, said method further comprising:

automatically presenting a training video based specific to use of the CPR manikin based upon the detection of the CPR manikin.

4. The method of claim 1, further comprising:

conveying a uniform resource locator associated with a training video within a message to a proximate computing mobile device of a user, wherein selection of the URL results in the training video being presented upon the proximate computing mobile device, wherein the proximate computing mobile device is a mobile phone.

5. The method of claim 1, further comprising:
receiving input to deactivate the training functionality of the portable medical kit and to thereby change a state of the AED from the training mode to an operational mode; and
processing the input to change the AED from the training mode to an operational mode.

6. The method of claim 1, further comprising:
detecting the portable medical kit is remote from a previously established base location, wherein the base location is a localized bound region outside of which is considered to be a training mode environment by default causing the training mode to be automatically activated when the portable medical kit is moved outside the localized bound region.

7. The method of claim 1, further comprising:
automatically enabling an automatic playback of a training content when interaction with the medical kit is detected and when the medical kit is in the training mode.

8. The method of claim 1, further comprising:
presenting a notification to indicate the portable medical kit is operating in a training mode to alert a user of the diminished capabilities of the AED corresponding to the training mode.

9. The method of claim 1, further comprising:
accessing at least one previously stored digital media from a storage medium of the portable medical kit, wherein the media is at least one of a training video and a training audio.

10. A system for enabling a portable medical kit with a training capability comprising:
a training engine of a portable medical kit configured to detect a removal of a portable medical kit from a base location and automatically responsive to the removal change an operational state of the portable medical kit into a training mode and to present at least one training media responsive to the removal and the activation of the training mode, wherein when in the training mode, the portable medial kit has artificially limited capabilities from those existent in an operational mode, wherein limitation of the capabilities is to enhance safety use of the portable medical kit while in the training mode, wherein the portable medical kit comprises at least one of a plurality of medical consumables including bandages, an automated external defibrillator (AED), at least one sensor for monitoring a quantity of the medical consumables present in the portable medical kit and for monitoring a charge state and power level of the AED, and a wireless transceiver for communicating the quantity of medical consumables present in the portable medical kit, the charge state and power level of the AED to at least one remotely located computing device; and
a data store of the portable medical kit configured to persist the at least one training media that specifically instructs a user on the user of the portable medical kit.

11. The engine of claim 10, wherein the base location is associated with a location beacon, said location beacon comprising a communication broadcast in a localized geographic region that defines regional boundaries of the base location, said location beacon and the communication broadcast further identifying a unique node of a first aid network, wherein the first aid network comprises of a plurality of kiosks providing first aid equipment and supplies.

12. The engine of claim 10, further comprising:
the training engine able to automatically present the training media stored with the data store of the kit, responsive to interaction with the medical kit when the medical kit is outside the base location and in the training mode.

13. The engine of claim 10, further comprising:
the training engine able to detect a proximate medical training equipment.

14. The medical training equipment of claim 13, wherein the medical training equipment is a medical simulation manikin.

15. The engine of claim 10, wherein the training content comprises training for using the medical consumables determined as being present in the portable medical kit to treat poisoning, burns, or fractures.

16. The engine of claim 10, further comprising:
the training engine determining a completion of a training media during a training functionality of the portable medical kit.

17. The engine of claim 16, further comprising:
the training engine communicating an event log of interaction between a user and at least one of the medical training equipment and the portable medical kit to a computing device.

18. A computer program product comprising a computer readable storage medium having computer usable program code embodied therewith, the computer usable program code comprising:
computer usable program code stored in a storage medium, if said computer usable program code is executed by a processor it is operable to detect at least one previously determined trigger within a portable medical kit, where the trigger changes a state of the medical state from an original state to a training state based on a detected action that is not a user input entered via a user interface, wherein the portable medical kit comprises at least one of a plurality of medical consumables including bandages, an automated external defibrillator (AED), at least one sensor for monitoring a quantity of the medical consumables present in the portable medical kit and for monitoring a charge state and power level of the AED, and a wireless transceiver for communicating the quantity of medical consumables present in the portable medical kit, the charge state and power level of the AED to at least one remotely located computing device;
computer usable program code stored in a storage medium, if said computer usable program code is executed by a processor it is operable to detect an occurrence of the trigger; computer usable program code stored in a storage medium, if said computer usable program code is executed by a processor it is operable to responsive to detecting the occurrence of the trigger, reactively automatically activate a training mode and a training functionality of the portable medical kit to enable safe practice with the portable medical kit, wherein the safe practice of training mode artificially limits capabilities of the AED from those existent in live functionality of the AED, wherein in the training mode the AED is limited so that electrical discharging of the AED to allow a heart to reestablish an effective rhythm is disabled while the training mode is active, wherein in absence of the detecting of the proximate medical equipment the AED is not in a training mode and capabilities of the AED to discharge electricity to allow a heart to reestablish an effective rhythm is enabled, wherein the training functionality comprises selectable training content that specifically instructs the user on the use of at least one of the kit and the medical training equipment;

computer usable program code stored in a storage medium, if said computer usable program code is executed by a processor it is operable to establish the completion of a portion of a set of objectives associated with the use of the portable medical kit while in the training mode; and computer usable program code stored in a storage medium, if said computer usable program code is executed by a processor it is operable to present a summary of the set of objectives based on the interaction while in the training mode.

19. The computer program product of claim 18, further comprising:

automatically updating a user profile associated with a licensed medical first responder, responsive to the appropriate completion of the training functionality of the portable medical kit.

20. The computer program product of claim 18, wherein the program is utilized to fulfill at least a portion of a continuing education unit.

\* \* \* \* \*